United States Patent Office 2,967,181
Patented Jan. 3, 1961

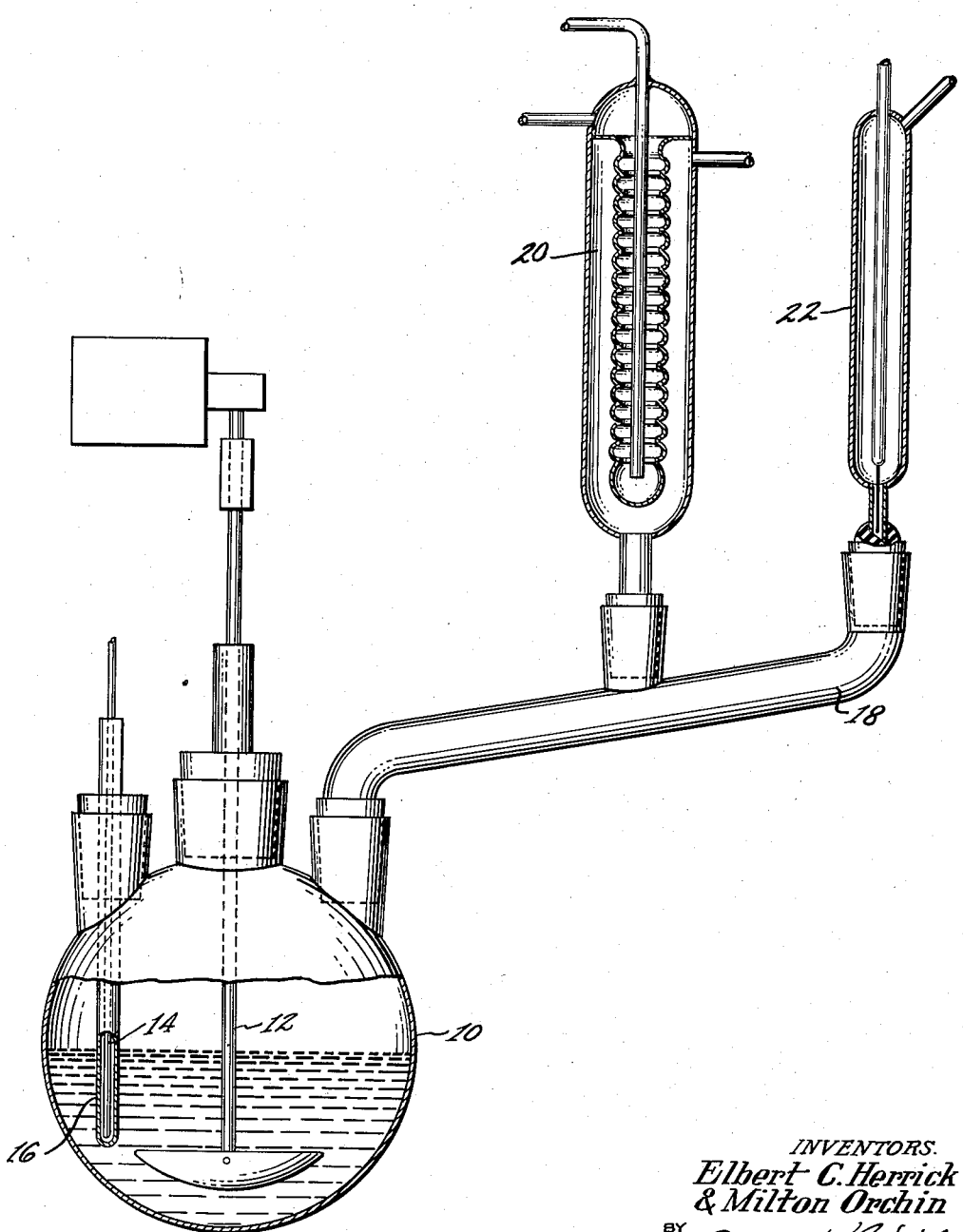

2,967,181
PROCESS FOR MAKING CYCLOPROPYL DERIVATIVES

Elbert C. Herrick, Media, Pa., and Milton Orchin, Cincinnati, Ohio, assignors to Houdry Process Corporation, Wilmington, Del., a corporation of Delaware Filed Aug. 30, 1957, Ser. No. 681,391

11 Claims. (Cl. 260—290)

The present invention relates to a process for making cyclopropyl derivatives, and in particular relates to a process for making cyclopropyl derivatives having extracyclic alpha-beta unsaturated carbon atoms in high yield.

In the earlier patent application Serial No. 554,427, filed December 21, 1955, for: Cyclopropyl Derivatives and Processes for Making the Same, there is disclosed a process for forming cyclopropyl derivatives in which a haloalkylating agent is added to a diolefinic compound, preferably a conjugated diolefinic compound, in the presence of an alkaline condensing agent to form a cyclopropyl derivative. The cyclopropyl derivatives obtained in patent application Serial No. 554,427 comprise:

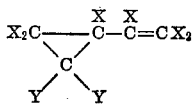

where X is a hydrogen atom or an alkyl radical, and where Y is a hydrogen atom or a negative group, such as halogen, carboxylic aryl groups, etc. In one preferred embodiment at least one Y is a halogen.

The process of the patent application Serial No. 554,427 produced the aforesaid compounds in fair yields ranging between about seventeen to twenty-eight percent.

There is now discovered a process for producing the aforesaid cyclopropyl derivatives in which yields in excess of 40% may be obtained, utilizing the relatively inexpensive sodium alkoxide as a condensing agent and without resort to the more reactive but expensive potassium alkoxide, although the latter type of condensing agent may be used, if desired. In the process of the present invention the addition of the haloalkylating agent to the diolefinic compound is effected in the presence of a substantial molar excess of the diolefinic compound; the overall excess of diolefinic compound to haloalkylating agent charged to the reaction providing a molar ratio of at least two to one, and with the haloalkylating agent being slowly added to refluxing diolefinic compound so that the effective ratio of diolefinic compound to haloalkylating agent during the course of the reaction is greatly in excess of the aforesaid overall molar ratio of diolefinic compound.

While in copending patent application Serial No. 554,427 it was noted that the presence of a diluent, such as relatively low molecular weight saturated hydrocarbons like butane may prove advantageous, in many instances this is not the case, and in certain instances the presence of a diluent which differs from the reactants may not result in any increase in the yield of desired cyclopropyl derivatives.

It is now discovered that when the reaction between the haloalkylating agent and the diolefinic compound is conducted in the presence of an alkaline condensing agent with the indicated high excess of diolefinic compound present, higher yields and selectivities are obtained, such higher yields being considerably above, as by 50% or more, the yields which can be obtained in copending patent application Serial No. 554,427, and with the formation of undesired polymers and other byproducts being suppressed or avoided.

In accordance with a preferred embodiment of the invention the haloalkylating agent is initially introduced into a refluxing portion of the diolefinic reactant at a feed rate providing at the zone of such initial mixing of the reactants a molar ratio of diolefin to haloalkylating agent of at least 6:1 before entering the main liquid pool in the reaction vessel. The diolefin thus acts not only as a reactant but functions also as a solvent, a temperature regulating agent (cooling), and as a diluent, avoiding undesired side effects of foreign agents for these purposes.

The process of the present invention is primarily applicable to conjugated diolefinic compounds, such as: butadiene, isoprene, 1,3-cyclopentadiene; and easily polymerizable diolefins such as 3-vinyl cyclohexene and allene; as well as to related compounds reacting in similar manner such as styrene; vinyl-pyridine; stilbene; and the like. However, the process of the present invention may also be applied to non-conjugated diolefinic compounds such as: 1,4-pentadiene; 1,4-cyclopentadiene; 1-vinyl-2,5-cyclohexadiene, and the like.

A wide variety of haloalkylating agents may be utilized. In the preferred embodiment of the present invention such agents include a plurality of halogen atoms, a hydrogen atom on the reactive carbon atom, and no hydrogen atom on carbon atoms alpha to the reactive carbon atom. These haloalkylating agents therefore comprise the formula:

where Y is a halogen atom, and X is H or a negative group such as a halogen atom, phenyl radical, carboxyl radical or the like but is other than an alkyl group containing an alpha hydrogen atom. Examples of such haloalkylating agents include: chloroform; bromoform; iodoform; dichloromethane; dichloracetic acid; dichloroacetone; pentachloroacetone; benzal chloride; dibromomethane difluoromethane; and the like.

A wide variety of alkaline condensing agents may be utilized, such as: potassium tertiary butoxide; sodium isopropoxide; elemental potassium; lithium propoxide; aluminum butoxide; lithium hydroxide; potassium hydroxide; magnesium ethylate; sodium methylate; and the like. As heretofore indicated high yields may be obtained using relatively low cost sodium alkoxide condensing agents. Moreover, it is advantageous in the present invention to form the alkaline condensing agents in situ.

The process of the present invention may be effected over a wide range of temperatures and pressures, but preferably is effected at as low a temperature as is feasible in order to avoid polymerization of the diolefinic compound.

The process of the present invention will be illustrated for the preparation of 1,1-dichloro-2-vinylcyclopropane. However, it is to be understood that the subject invention is equally applicable to the preparation of a wide variety of related cyclopropyl derivatives, such as the preparation of 1,1-dichloro-2-methyl-2-vinyl-cyclopropane from chloroform and isoprene.

Referring to the drawing 2.2 mols of sodium tertiary butoxide is formed in situ within the reactor 10 by the reaction of excess tertiary butanol and sodium metal. Excess alcohol is distilled off to leave dry alkali metal butoxide. To this is then added 5.3 mols of butadiene, with agitation and refluxing from the condenser 20. When the system has been cooled, dried out and the alkali metal alkoxide well dispersed, condensate from condenser 20 will be returning through high dilution arm 18 to the reactor 10 at an even rate. At this point, the addition of chloroform is begun from the charge tank 22 at such a rate that at least 6 to 10 parts of butadiene are provided as solvent and reactant from condenser 20 to high dilution arm 18, per part of chloroform introduced from charge tank 22. Butadiene, under these conditions, is in almost infinitely large quantity relative to chloroform, or carbene precursor on entering the reactor 10. Chloroform readily reacts with butadiene and alkali metal alkoxide with exceedingly high selectivity for 1-2 addition, forming 1,1-dichloro-2-vinyl-cyclopropane.

As the reaction progresses, butadiene is consumed in the synthesis, but it is nevertheless present in high ratio to chloroform and is continuously recycled to the reactor in at least a ratio of 6 to 10 parts of condensate per part of fresh chloroform through high dilution arm 18. The temperature is controlled in the range of —10° C. to +10° C. by the refluxing butadiene.

The overall amount of chloroform added to the system was 2.2 mols.

Under the aforesaid conditions a 41.6% by weight yield of 1,1-dichloro-2-vinylcyclopropane was obtained.

When the reaction was repeated with butane being substituted for butadiene as the diluent, yields within the range of between about 17% and 20% by weight were obtained.

The compounds of the present invention, such as 1,1-dichloro-2-vinylcyclopropane, may be used as pesticides for body lice and the like, and as mosquito larvacides. These compounds also have some potency as hypnotics.

The vinyl side chain of the compounds produced by the process of the present invention may be hydrogenated. Thus, 1,1-dichloro-2-vinylcyclopropane may be hydrogenated with gaseous hydrogen, preferably in the presence of a hydrogenation catalyst, to produce 1,1-dichloro-2-ethyl cyclopropane.

1,1-dichloro-2-vinylcyclopropane may be oxidized to yield 2,2'-dichloro-cyclopropyl carboxylic acid through reaction with a conventional oxidizing agent such as potassium permanganate, such oxidation being preferably conducted at relatively low temperatures, such as 0° C.

The oxidized derivatives of the cyclopropyl derivatives produced by the process of the present invention have expected utility as intermediates for the formation of insecticides containing a vinyl cyclopropane carboxylate nucleus. Thus, such compounds are closely related to pyrethronic acid which is one of the active principles derived from pyrethrum.

In addition, the olefinic group of the cyclopropyl derivatives obtained from the process of the present invention may be oxidized to form a ketone derivative; or may be hydroxylated to form a glycol derivative; or may be oxidized to form the epoxide derivative; or ozonized to form the ozonide derivative and the acid; or may be halogenated; or may be polymerized; or alkylated.

Furthermore, the halogen derivatives of the compounds produced by the process of the present invention may be converted to nitrile groups and then reduced to the amine group, or oxidized to the acid or amide. Alternatively, the halogen derivatives may be aminated; alkylated as by the Wurtz reaction with sodium metal; hydrolyzed to the alcohol or ketone; or reacted to form a metallo-organic derivative.

The present invention may be embodied in other specific forms without departing from the spirit or essential attributes thereof and, accordingly, reference should be made to the appended claims, rather than to the foregoing specification as indicating the scope of the invention.

The present invention is a continuation in part of application Serial No. 554,427, filed December 21, 1955.

It is claimed:

1. In the process of synthesizing halided cyclopropyl derivatives by condensing an olefinic compound with a haloalkylating agent in the presence of an alkali metal alkoxide condensing agent, the method which comprises charging an olefinic hydrocarbon having 3 to 8 carbon atoms containing at least two double bonds in the molecule to a reaction zone in admixture with such condensing agent, thereby providing a principal body of liquid in said reaction zone, continuously withdrawing from said liquid a portion of the olefinic hydrocarbon in vapor state, cooling and condensing the portion so withdrawn and continuously charging the cooled condensate to a premixing zone, adding haloalkylating agent to said premixing zone for dilution by said condensate and at such rate that there are present in said premixing zone at least 6 mols of the olefinic hydrocarbon per mol of said haloalkylating agent, and charging said haloalkylating agent so diluted with olefinic hydrocarbon to said reaction zone and therein agitating the same with the principal body of liquid, said haloalkylating agent being a compound of the formula

in which Y is halogen and X is selected from the group consisting of H and halogen.

2. In the process of synthesizing cyclopropyl halide derivatives by condensing an olefinic hydrocarbon having 3 to 8 carbon atoms and containing at least two double bonds with a haloalkylating agent in the presence of an alkali metal alkoxide condensing agent, wherein said haloalkylating agent is a compound of the formula:

in which Y is halogen and X is selected from the group consisting of H and halogen, the improvement which comprises mixing said condensing agent and said olefinic hydrocarbon in a reaction zone maintained at —10 to +10° C. thereby providing a liquid pool in said reaction zone, vaporizing a portion of said olefinic hydrocarbon from said pool and passing the vaporized portion to a cooler condensing zone, charging the thus cooled condensate to a premixing zone communicating with but spaced from said reaction zone, adding aliquot portions of the haloalkylating agent to said premixing zone for solution in and dilution by said cooled condensate and passing the obtained cool solution to the reaction zone for admixture in said liquid pool thereby causing condensation of said olefinic hydrocarbon with said haloalkylating agent in the presence of the condensing agent and forming thereby halogenated cyclopropyl compounds; the rate of addition of the haloalkylating agent to said premixing zone being controlled to provide at least 6 mols of olefinic hydrocarbon per mol of said haloalkylating agent in said zone.

3. A process in accordance with claim 2 wherein the olefinic hydrocarbon is a conjugated acyclic diolefin.

4. A process in accordance with claim 3 wherein the olefinic compound is butadiene.

5. A process in accordance with claim 2 wherein the olefinic compound is isoprene.

6. A process in accordance with claim 2 wherein the olefinic compound is 1,3-cyclopentadiene.

7. A process in accordance with claim 2 wherein the olefinic compound is styrene.

8. A process in accordance with claim 2 wherein the olefinic compound is vinyl pyridine.

9. The process of preparing 1,1-dichloro-2-vinylcyclopropane which comprises admixing butadiene with sodium tertiary butoxide, agitating said mixture under refluxing conditions in a reaction zone so as to provide a returning cooled condensate of butadiene, adding chloroform to the returning cooled condensate en route and at such a rate as to provide a solution of chloroform in butadiene containing at least 6 mols butadiene per mol of chloroform, charging said solution to the reaction zone and agitating the same with the liquid mixture therein, the temperature in the reaction zone being maintained in the range of −10 to +10° C. by the refluxing butadiene, and there being maintained in the reaction zone throughout the reaction an over-all excess of butadiene of at least 2 mols per mol of chloroform.

10. The process for synthesizing cyclopropyl derivatives containing extra cyclic alpha-beta unsaturated carbon atoms which comprises condensing a conjugated diolefinic hydrocarbon containing 3 to 8 carbon atoms with a chloromethylating agent in the presence of an alkali metal alkoxide, said diolefinic hydrocarbon being present in the reaction mixture in an overall molar ratio to the chloromethylating agent of at least 2:1, said chloromethylating agent being a compound of the formula

in which Y is a halogen and X is selected from the group consisting of H and halogen, said chloromethylating agent being added to the reaction mixture in aliquot proportions dissolved and diluted in a premixing zone with the cooled condensate obtained by vaporizing a portion of the diolefinic hydrocarbon and condensing the same by cooling, said solution containing at least 6 mols of diolefinic hydrocarbon per mol of chloromethylating agent.

11. The process in accordance with claim 2 in which the olefinic hydrocarbon is selected from the group consisting of butadiene, isoprene, cyclopentadiene, vinylcyclohexene, allene, styrene, 1,4-pentadiene, and vinylcyclohexadiene.

References Cited in the file of this patent

Doering et al.: J. Am. Chem. Soc., 76, pp. 6162–6165 (1954).